United States Patent [19]

Juy

[11] Patent Number: 4,627,827
[45] Date of Patent: Dec. 9, 1986

[54] DEVICE FOR THE ASSEMBLY ESPECIALLY OF THE JOINT OF THE CHAIN-GUIDE TENSIONING ARM OF THE SPEED CHANGE GEARS FOR BICYCLES AND SIMILAR VEHICLES

[76] Inventor: Henri Juy, 3-5 rue de la Breuchilliere, Dijon zone industrielle Dijon, St-Appolinarie, France

[21] Appl. No.: 727,567

[22] Filed: Apr. 26, 1985

[30] Foreign Application Priority Data

Apr. 24, 1984 [FR] France ................... 84 06761

[51] Int. Cl.⁴ .............................................. F16H 9/00
[52] U.S. Cl. ........................................ 474/80; 474/82
[58] Field of Search ................................ 474/80, 82

[56] References Cited

U.S. PATENT DOCUMENTS

| 4,406,643 | 9/1983 | Shimano | 474/82 |
| 4,443,208 | 4/1984 | Kozakae | 474/82 |
| 4,530,678 | 7/1985 | Wechsler | 474/82 X |

FOREIGN PATENT DOCUMENTS 512567 7/1952 Belgium ..................... 474/82
8110380 11/1982 France .

Primary Examiner—James A. Leppink
Assistant Examiner—Frank McKenzie
Attorney, Agent, or Firm—Eric P. Schellin

[57] ABSTRACT

The subject matter of the invention refers to the technical area of vehicles in general, of cycles and similar vehicles and their fittings and accessories.

A rod (4) or equivalent means is mounted in the lower bracket (1) perpendicularly to the cylindrical recess axis (1b) and secant with the peripheral part of said recess, to assume the dual function of holding the bolt (2) with respect to the bracket (1) and end stopping the rotation of the tensioning arm (D) integral with the bolt (2) with respect to the bracket (1) because of the suitable arrangement of a bearing surface (2d) of the bolt which is in the plane and opposite the rod (4); an elastic means (5) for retensioning the tensioning arm being mounted inside the bracket and suitably connected to the bolt on the one hand and to said bracket on the other hand.

10 Claims, 9 Drawing Figures

DEVICE FOR THE ASSEMBLY ESPECIALLY OF THE JOINT OF THE CHAIN-GUIDE TENSIONING ARM OF THE SPEED CHANGE GEARS FOR BICYCLES AND SIMILAR VEHICLES

As a corollary, the speed change gears manufactured and assembled according to this device are included within the scope of the invention.

The subject matter of the invention refers to the technical area of vehicles in general, of cycles and similar vehicles and their fittings and accessories.

The speed change gears for bicycles and similar vehicles generally include a chain-guide tensioning arm pivotally mounted around a bolt in a bracket at the lower part of the crosswise motion system of the change gear. The tensioning arm swivels with an angular motion which is limited in both directions, in a common manner, by means of an external stop of the arm abutting against the lower bracket. The chain-guide tensioning arm is most frequently, although not limitatively, composed of two flanges between which are freely rotating at least one and most generally two rollers on which the chain is resting and is partially wound.

One knows for instance the French Pat. No. 2 506 251 which refers to a change gear in which the chain-guide tensioning arm operates a joint bolt with an angular locking means and a re-tensioning spring.

The angular stop of the bolt is carried out by a screw which partially protudes in the bore of the bracket accomodating such bolt thus appearing at the lower part of the bracket. The spring is fastened in one part of the bracket and in one part of the tensioning arm thus generating a problem of dependence making it difficult to assemble the bracket on the tensioning arm and a problem of tightness.

According to the invention, it has been wanted to cope with these inconveniences by a new design of the lower bracket and of the assembly of said bracket with respect to the tensioning arm bolt, as well as of the assembly of the spring operating in a torsional manner, with respect to said bracket and said bolt. Thus noticeable advantages are brought forward referring to the removal of the head or bolt end protuding outwardly from the lower bracket, the removal of the apparent external stop of the chain-guide tensioning arm, the improved tightness.

To reach the target aimed at, the invention as it is characterized in the claims is noteworthy in that the joint bolt of the tensioning arm is fixed integral with said chainguide tensioning arm or with a flange of this arm, while the lower bracket which is arranged so as to be fixed to the crosswise motion system of the change gear, is provided with a cylindrical recess to accomodate said bolt, this recess being open on the tensioning arm end and closed on the outer end; a rod or equivalent means being mounted in the lower bracket perpendicularly to the axis of the cylindrical recess, intersecting with the peripheral part of said recess, said rod assuming the dual function of holding the bracket with respect to a shoulder of the joint bolt and stopping in both swivelling directions the tensioning arm with respect to a suitably arranged bearing of the joint bolt integral with said arm; an elastic means for re-tensioning the tensioning arm being mounted inside the bracket and suitably fastened to the bolt on the one hand and to said bracket on the other hand, independently from the tensioning arm.

The advantages obtained thanks to this invention mainly consist in that the special assembly of the rod in the bracket which does not protude from said bracket, allows a dual function of coupling of the bracket to the bolt in an axially non separable manner and of angular stop in both directions of the bolt.

On the other hand, the return spring is mounted fully independent from the tensioning arm thus making the assembly easier without giving attention to the positioning and tensioning of said spring, such an assembly allowing in addition to interpose a seal.

The invention is described hereinafter with greater particularity with reference to the drawings which illustrate only one embodiment.

Figure 1:
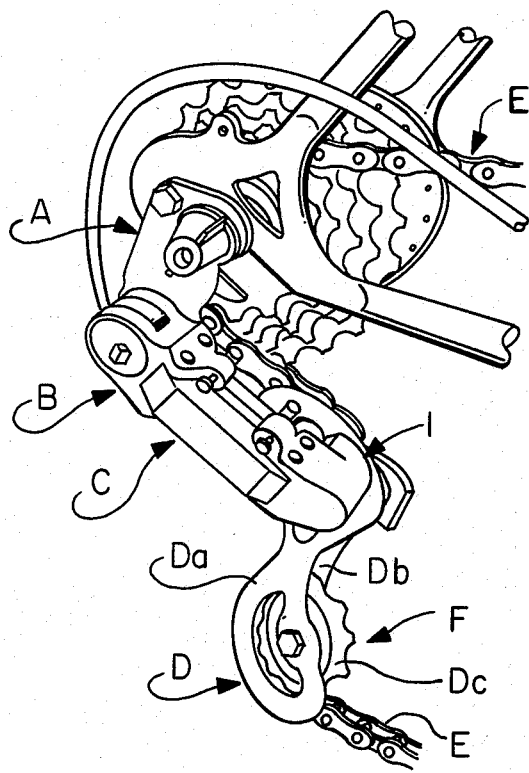
FIG. 1 shows through a general layout view and as an example of embodiment, a change gear fitted with the device of the invention, especially with a closed lower bracket, the bolt end not being apparent.
Figure 2:
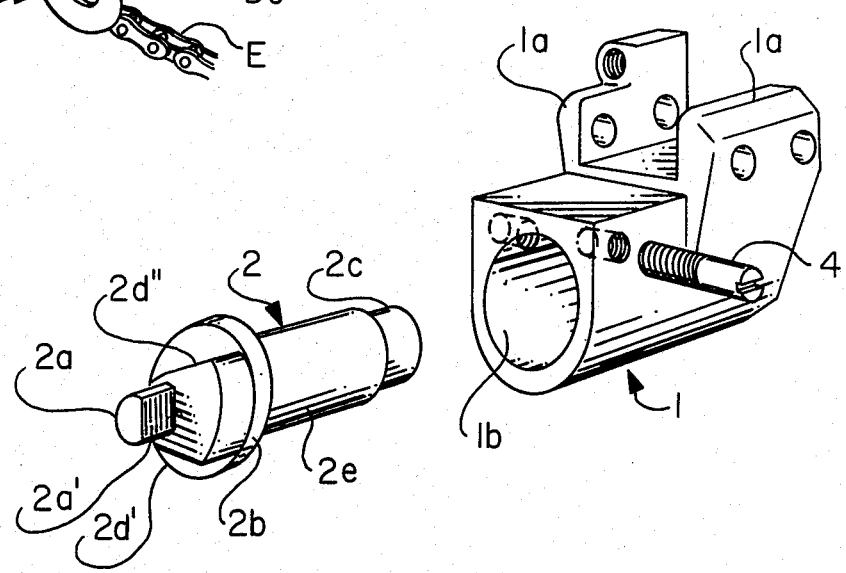
FIG. 2 shows through perspective views an embodiment of the lower bracket and also in the axial alignments of the assembly, the joint bolt and the holding and stopping rod.
Figure 3:
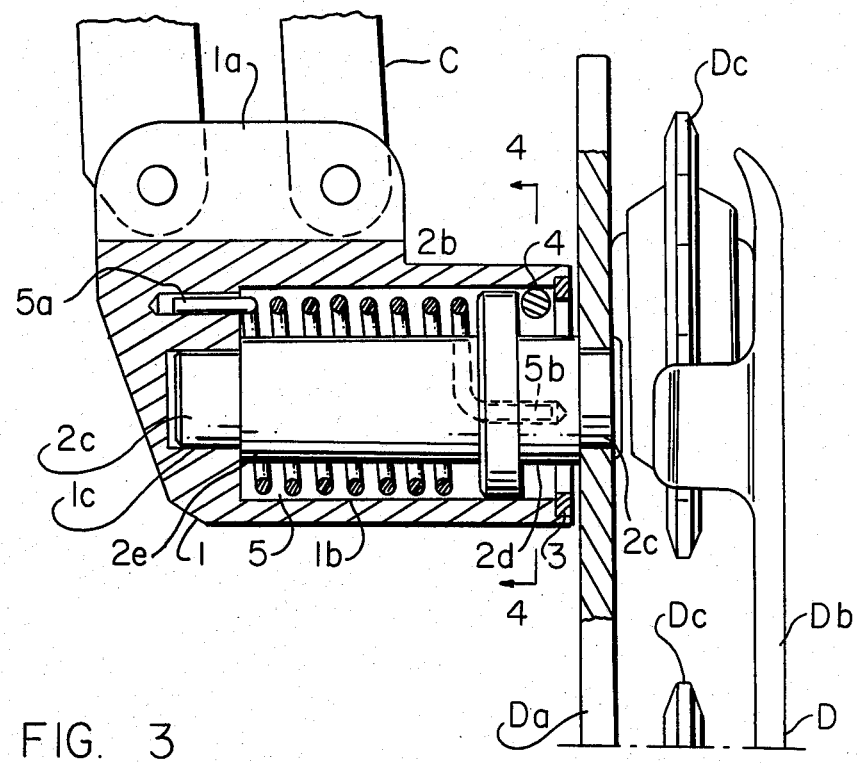
FIG. 3 is a section view of the lower bracket, showing the device.

It has been especially shown at FIG. 1, a change gear for bicycles or similar vehicles, of the type with the mounting lug (A) fixed to the shaft of the rear wheel of the cycle. This lug includes an upper bracket (B) and a crosswise moving system with articulated parallelogram represented in the assembly by (C). The parallelogram sides are linked in an articulated manner to a lower bracket (1) achieved according to the characteristics of the joint assembly device as per the invention. On this bracket is articulated a chain-guide tensioning arm (D) swivelling with a limited angular motion in both directions so as to tension the free end of the chain (E).

The tensioning arm (D) may be achieved in various manners, and in the non limiting illustrated example, it consists of two flanges (Da and Db) between which are freely rotating one and more generally two rollers (Dc) as shown, the chain (E) resting upon these rollers around which it is partially wound.

It is pointed out that the crosswise motion system may be of any known type, other that the articulated parallelogram shown and for instance a sliding transverse shaft system. In the same manner, the change gear may be fastened to the bicycle otherwise than with the mounting lug (A).

According to the invention, the joint bolt (2) is fastened integral with the tensioning arm (D) and more specifically to the flange (Da) in the illustrated example.

For that purpose, the end (2a) is a bearing surface with at least one flat (2a') which is inserted in a relevant hole of the flange (Da). The end (2a) is then set in to make the bolt (2) integral with the tensioning arm (D).

The lower bracket (1) which may be moulded or injected, made from metal, alloy or plastic material, is provided with lugs (1a) in the illustrated example, to be fixed in an articulated manner to the connecting rods of the articulated parallelogram system (C).

The body of bracket (1) is provided with cylindrical recesses (1b and 1c) to be firmly maintained and slidably engaged with free rotation on the bearing surfaces (2b) and (2c) of bolt (2). For that purpose, the recess (1b) is open on the flange (Da) end of the tensioning arm (D), and it is closed on the outer end. It thus allows to suppress, with respect to the usual assemblies of the lower bracket, the outer opening of the recess of the bracket and the head or apparent fixing means, which prevent the assembly tightness and allow seepages of water, dust or other elements disturbing the suitable operation and damaging the change gear.

In order to avoid any seepages and to seal the recess (1b) opening end, it is designed to mount a lip seal (3), of the type known by itself, at the end of the recess (1b), the seal lip (3) being in friction against the tensioning arm and more precisely against flange (Da) in the example illustrated. The lubricating grease is kept inside the bracket.

To make the insertion of bracket (1) on bearing surfaces (2b) and (2c) of bolt (2) easier, the angles of said bearing surfaces, on the insertion side, are broken by a circular chamfer as illustrated.

To simplify the manufacture and improve the appearance by suppressing any stop and external projection on the bracket and/or tensioning arm, and the risks inherent in such an external stop assembly, a threaded rod (4) or an equivalent means possibly, is mounted in the bracket (1) and with respect to bolt (2) so as to assume a dual function. For that purpose, the rod (4) is inserted and screwed in the bracket (1) perpendicularly to the recess (1b) axis, through tangent intersection in the illustrated example, or approximately, with the peripheral part of said recess (1b) and near the open end of this recess, between said open end and the large dia bearing surface (2b) of bolt (2).

Thus, the bracket (1) is linked to the bolt (2), and to the tensioning arm (D) in an axially non separable manner, while allowing a relative angular motion. To separate the elements, it is necessary to dismantle the rod (4).

On the other hand, the rod (4) plays the part of an inside stop in both angular motion directions of arm (D) and bolt (2).

Figure 4:
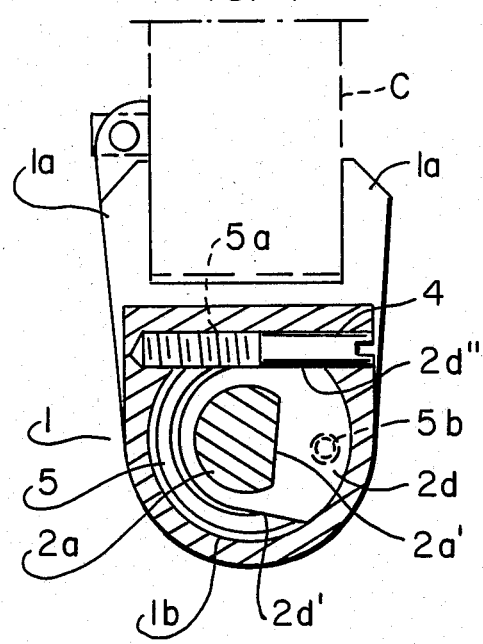
FIGS. 4 and 5 are similar section views considered according to the line 4.4. of FIG. 3, showing the two extreme angular stop positions of the bolt integral with the tensioning arm with respect to the stop rod.
Figure 5:
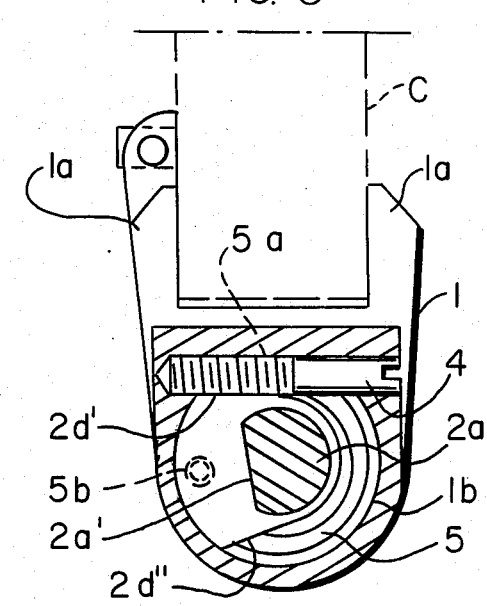
Figure 7:
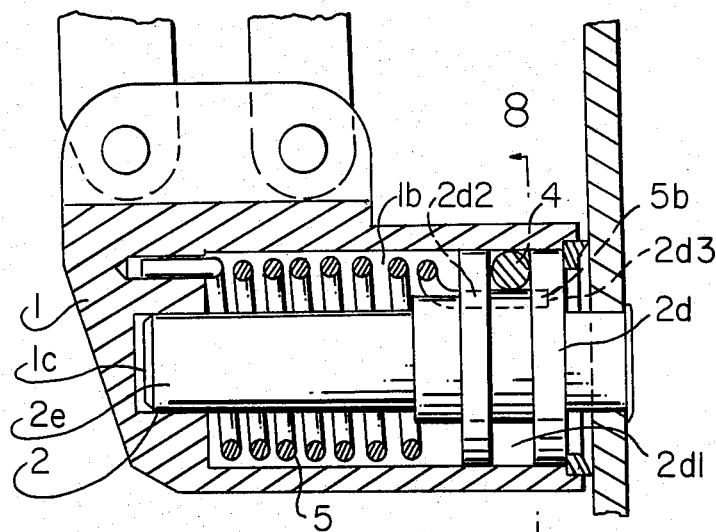
FIG. 7 is a longitudinal section view of the lower bracket.

For that purpose, the bearing surface (2d) of bolt (2) which is in the plane and opposite the rod (4) is provided with a wide notch and flats (2d'-2d") formed according to judicious angles taking into account the amplitude of the angular motion allowed, in both directions, for arm (D) and bolt (2). The FIGS. 4 and 5 illustrate the dual stop effect provided by rod (4) in combination with bearing surface (2d) and the flats (2d'-2d") in this bearing surface.

Figure 6:
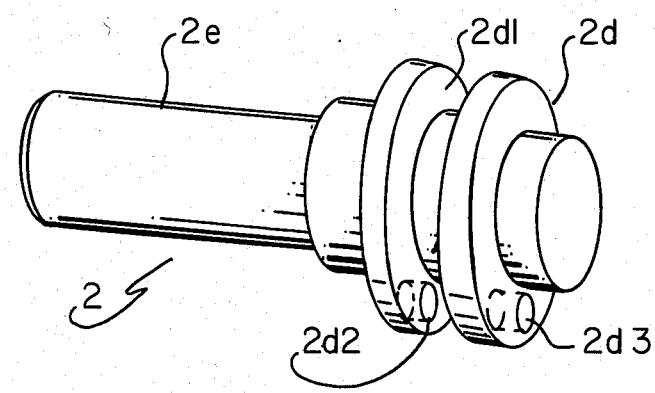
FIG. 6 is a perspective view of the joint bolt achieved according to another embodiment.

In an embodiment illustrated on FIG. 6 especially, the bearing surface (2d) of bolt (2) has a circular groove (2d1). The rod (4) is secant with respect to groove (2d1). Thus the angular swivelling of the joint bolt (2) of the tensioning arm is not hindered by the screw (4) which, however, goes on playing the part of an inside stop in both angular motion directions of the arm secured to said bolt (2).

Figure 8:
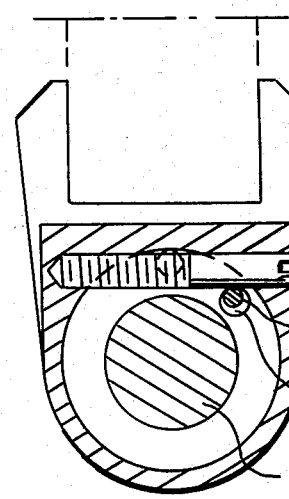
FIGS. 8 and 9 are similar section views considered according to the line 8.8. of FIG. 7 showing the two extreme angular stop positions of the joint bolt with respect to the stop rod in combination with the relevant end of the spring.
Figure 9:
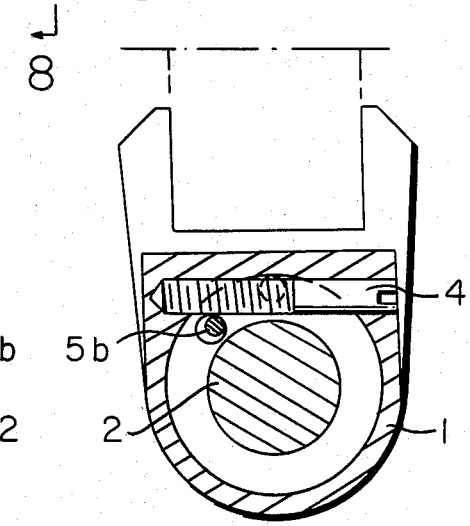

For that purpose, the bearing surface (2d) of bolt (2) is longitudinally drilled through, thereby forming two coaxial holes breaking through the groove (2d1). These two holes (2d2) and (2d3) allow the engagement and positioning of one part of the elastic means acting in one swivelling direction of the arm (D) so as to tension the chain according to arrow (F) (FIG. 1), as a torsional spring (5) mounted in the recess (1b), around the bearing surface (2e) of bolt (2). To give it the tension necessary for the angular drive of the arm (D), a bent end (5a) of the spring is inserted into a hole drilled in the bottom of the recess (1b), the other bent end (5b) at the other end of the spring is inserted in both holes (2d2) and (2d3). At the assembly, the rod (4) is positioned after assembly and tension of spring (5) by its bent ends inserted into the relevant holes of the bracket and bolt. Thus, the result is that the end (5b) passes through the groove (2d1) being therefore likely to cooperate in abutment with the rod (4). FIGS. 8 and 9 illustrate the dual stop effect assumed by the rod (4) in combination with the end (5b) of the spring (5).

The groove (2d1) of the bolt bearing surface may be easily obtained by turning, thus facilitating and multiplying the production, while decreasing the manufacturing cost.

In the embodiment of FIGS. 2 to 5, the spring (5) is preloaded in combination with bolt (2) and bracket (1) as stated above, i.e. that that bent end (5a) is inserted into the hole drilled into the bottom of the recess (1b), while the other end (5b) is inserted into a hole drilled in the bearing surfaces (2b) and (2d).

In order to improve the tightness, the hole drilled in the bearing surfaces (2b-2d) and the hole (2d3) for the end (5b) should not break through the face of the bearing surface (2d) which is on the rod end (4).

It is not possibly excluded that the upper bracket (B) of the change gear be arranged and mounted, as far as its joint is concerned, according to all or some part of the characteristics of the device.

I claim:

1. Device for the assembly of the joint of the chain-guide tensioning arm of speed change gears for bicycles and similar vehicles, in which the tensioning arm (D) is swivelling with a limited angular motion in both directions under an elastic pushing action in one direction, in a bracket (1) at a lower part of a crosswise motion system (C) of the change gear, wherein a joint bolt (2) of the tensioning arm (D) is fastened integral with said chain-guide tensioning arm or with a flange (Da) of this arm, while a lower support (1) which is arranged to be fastened to the crosswise motion system (C) of the change gear, is provided with a cylindrical recess (1b-1c) to accomodate said bolt, said recess being open on the tensioning arm end and closed on an external end, characterized in that a rod (4) or equivalent means is mounted in a lower bracket (1) perpendicularly to a cylindrical recess axis (1b) and secant with a peripheral part of said recess, to assume a dual function of holding the bolt (2) with respect to the bracket (1) and end stopping the rotation of the tensioning arm (D) integral with the bolt (2) with respect to the bracket (1), due to the arrangement of a bearing surface (2d) of the bolt which is in a plane with and opposite the rod (4); an elastic means (5) for re-tensioning the tensioning arm being mounted inside the bracket and connected to the bolt and to said bracket.

2. Device according to claim 1, characterized in that the end of the joint bolt which is fastened to the tensioning arm or flange of said tensioning arm, is provided with at least one flat and is inserted into a hole in the arm or flange for assembly.

3. Device according to claim 1, characterized by the provision of a lip sealing means (3) at the open end of the recess (1b) of bracket (1), said lip being in friction against the tensioning arm.

4. Device according to claim 1, characterized by chamfers breaking angles of bearing surfaces (2b-2c) of the bolt (2) on an insertion end of the bracket (1) on said bearing surfaces.

5. Device according to claim 1, characterized in that the rod (4) or equivalent means is mounted with tangent intersection with respect to the peripheral part of the recess (1b) of the bracket (1) and near the open end of said recess, between said open end and a large diameter bearing surface (2b) of bolt (2).

6. Device according to claim 1, characterized in that the bearing surface (2d) of bolt (2) is provided with a circular groove (2d1) in which said rod is secantly positioned, while said bearing surface (2d) is arranged so that some part of the elastic means (5) passes through the groove (2d1) to co-operate, in abutting position, with the rod (4) which serves as end stop in both directions of angular motion of the tensioning arm and bolt (2).

7. Device according to claim 1, characterized in that the bearing surface (2d) of bolt (2) has a wide notch and flats (2d'-2d") formed at suitable angles, taking into account the amplitude of angular motion allowed in both directions, for the tensioning arm (D) and bolt (2).

8. Device according to claim 1, wherein the elastic means acting in a swivelling direction of the tensioning arm (D) is a torsional spring (5) mounted in recess (1b) of the bracket around a bearing surface (2e) of the bolt, characterized in that a bent end (5a) at one end of the spring is inserted into a hole drilled in the bottom of said recess (1b), another bent end (5b) at the other end of the spring is inserted into a hole drilled in the bearing surfaces (2b-2c) of the bolt (2), and wherein an elastic tension is given to the spring (5) at the assembly, before positioning the rod (4).

9. Device according to claim 1, wherein the elastic means acting in a swivelling direction of the tensioning arm (D) is a torsional spring (5) mounted in the recess (1b) of the bracket, around a bearing surface (2e) of the bolt, characterized in that the bearing surface (2d) of the boly (2) is longitudinally drilled through thereby forming two coaxial holes (2d2) and (2d3) breaking through the groove (2d1) for insertion and positioning of end (5b), end (5a) being inserted into a hole drilled in the bottom of the recess (1b) of the bracket, and wherein an an elastic tension is given to spring (5) at the assembly, before replacing rod (4).

10. Device according to claims 8 or 9, characterized in that the hole drilled in the bearing surfaces (2b-2c) of the bolt and the hole (2d3) to insert the end (5b) of spring (5), does not break through the face of the bearing surface (2d) which is on the rod (4) end, to improve tightness.

* * * * *